(No Model.)
3 Sheets—Sheet 1.
T. & H. T. H. COLDWELL.
BICYCLE COUPLING.
No. 581,953. Patented May 4, 1897.
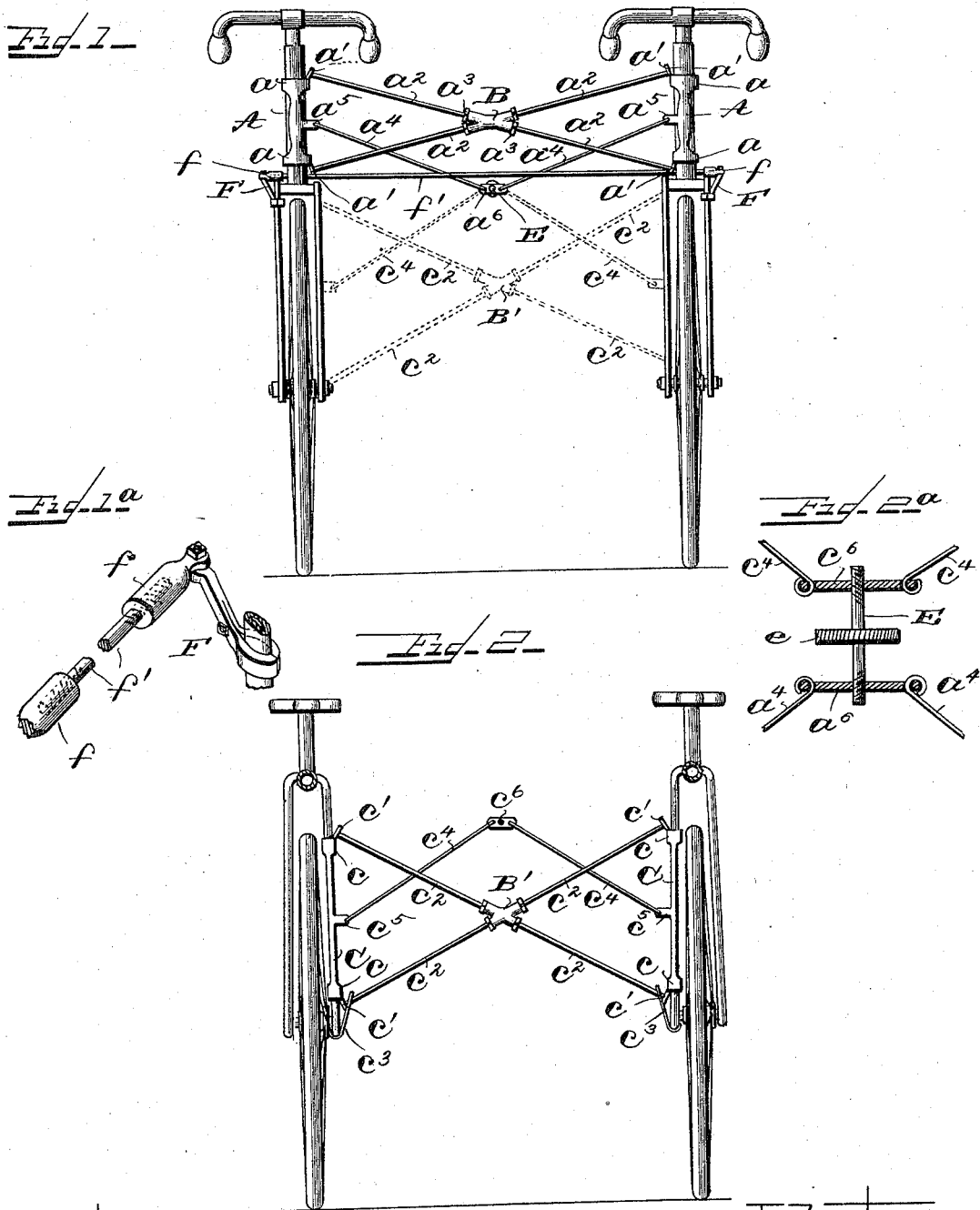

(No Model.) 3 Sheets—Sheet 2.
T. & H. T. H. COLDWELL.
BICYCLE COUPLING.
No. 581,953. Patented May 4, 1897.
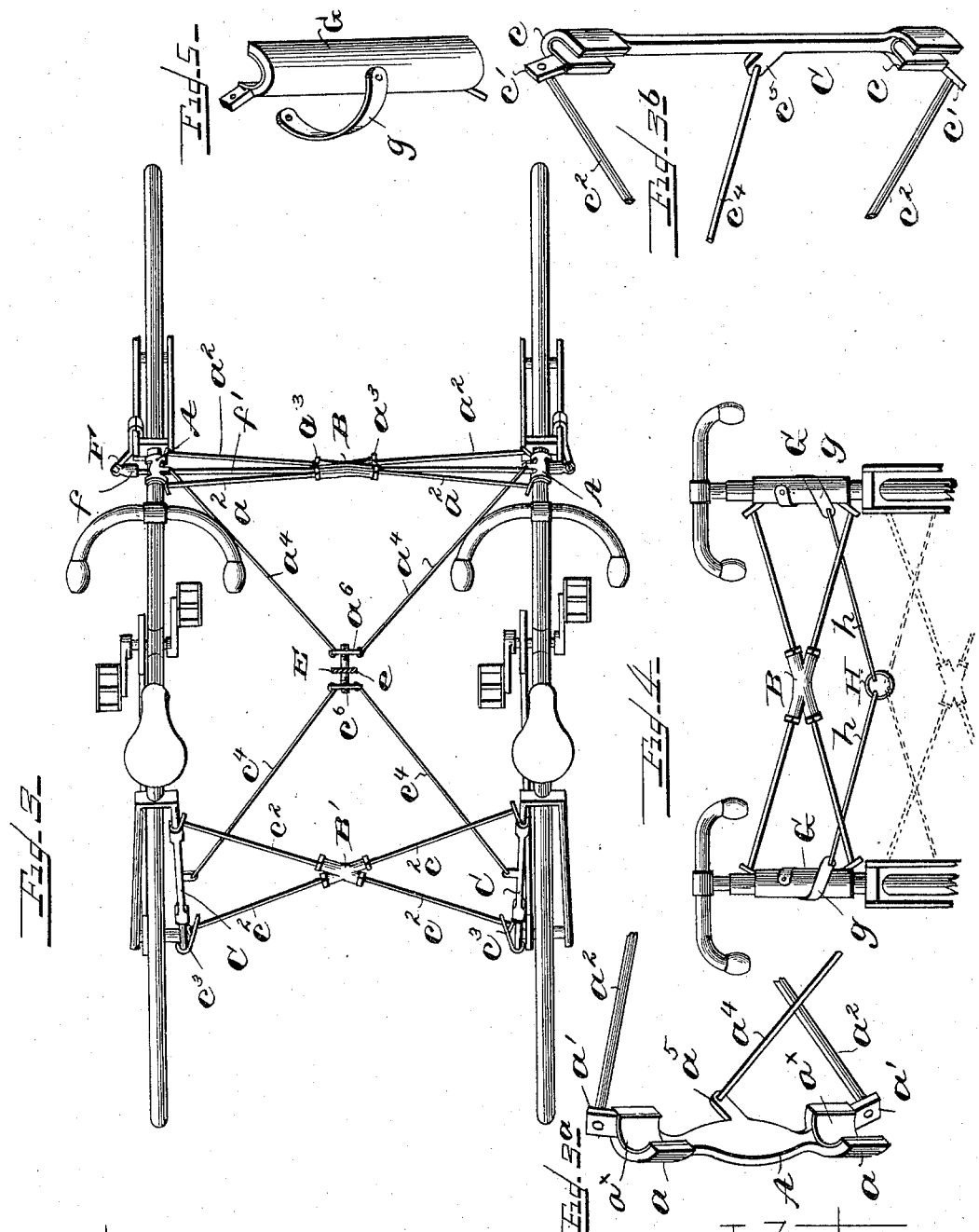
Witnesses
Inventors
Thomas Coldwell and
Harry T. H. Coldwell
By Whitaker & Prevost Attys.

(No Model.) 3 Sheets—Sheet 3.
T. & H. T. H. COLDWELL.
BICYCLE COUPLING.
No. 581,953. Patented May 4, 1897.
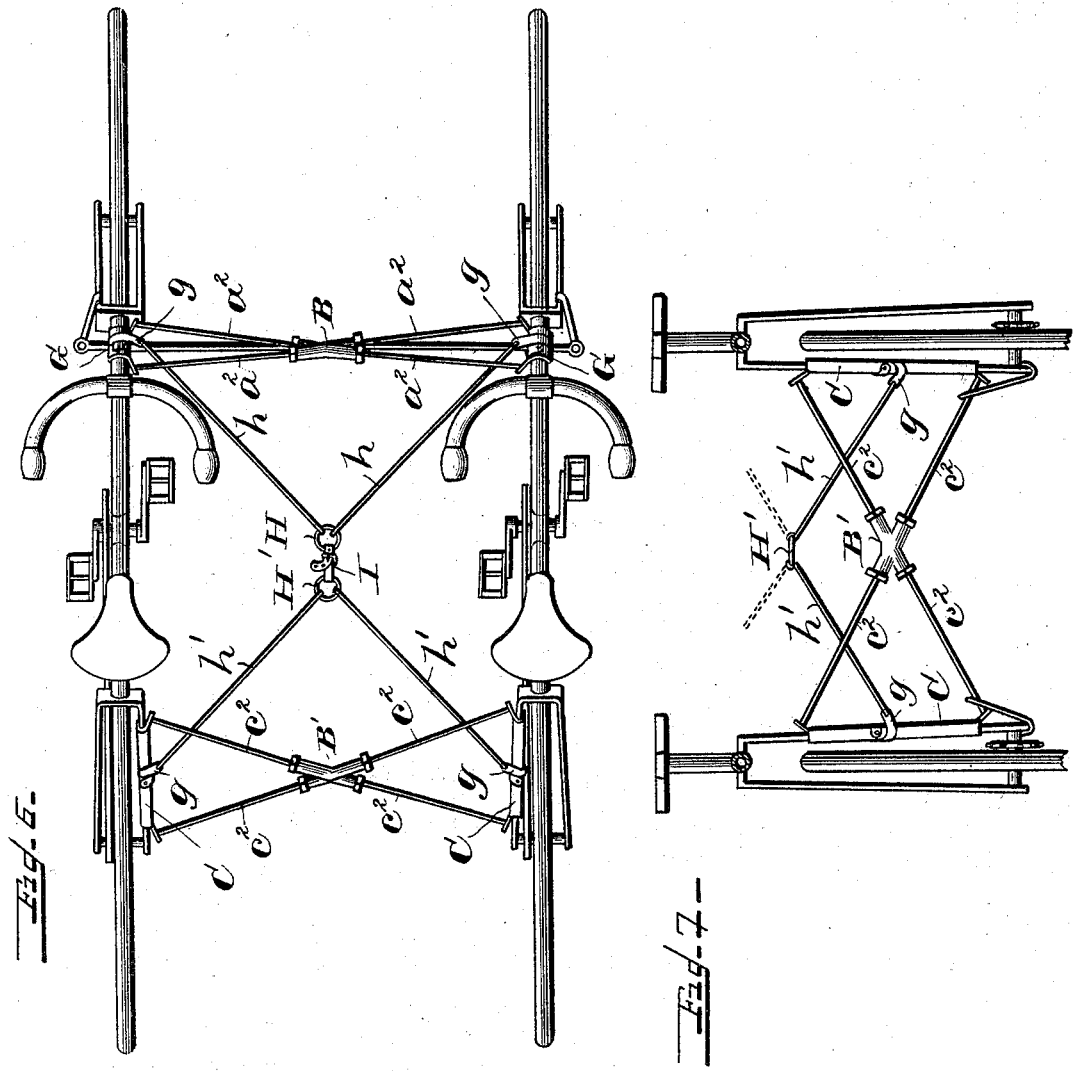
Witnesses
G. A. Pauberschmidt.
J. D. Kingsberg.
Inventors
Thomas Coldwell
Harry T. H. Coldwell
By Whitaker & Prevost Attys
THE NORRIS PETERS CO., PHOTO-LITHO., WASHINGTON, D. C.

UNITED STATES PATENT OFFICE.

THOMAS COLDWELL AND HARRY T. H. COLDWELL, OF NEWBURG, NEW YORK.

BICYCLE-COUPLING.

SPECIFICATION forming part of Letters Patent No. 581,953, dated May 4, 1897.

Application filed August 1, 1896. Serial No. 601,331. (No model.)

*To all whom it may concern:*

Be it known that we, THOMAS COLDWELL and HARRY T. H. COLDWELL, citizens of the United States, residing at Newburg, in the county of Orange and State of New York, have invented certain new and useful Improvements in Bicycle-Couplings; and we do hereby declare the following to be a full, clear, and exact description of the invention, such as will enable others skilled in the art to which it appertains to make and use the same.

Our invention is an improvement in bicycle-couplings; and it consists in the novel features hereinafter described, reference being had to the accompanying drawings, which illustrate one form in which we have contemplated embodying our invention, and said invention is fully disclosed in the following description and claims.

Referring to the said drawings, Figure 1 is a front view of two bicycles secured together side by side by our improved coupling, the parts of the coupling engaging the rear forks being shown in dotted lines to avoid confusion. Fig. 1$^a$ is a detail view of one of the steering-arms and the connecting-bar. Fig. 2 represents a vertical transverse section of the two bicycles, showing the portion of the coupling which engages the rear forks. Fig. 2$^a$ represents a sectional view of the screw connection for securing the front and rear parts of the coupling together. Fig. 2$^b$ represents a sectional view of one of the central castings. Fig. 3 is a top plan view of the two bicycles and the coupling. Fig. 3$^a$ is a detail perspective view of one of the parts which engage the heads of the bicycle. Fig. 3$^b$ is a similar view of one of the devices for engaging the rear fork. Fig. 4 represents a front view of portions of two bicycles and the coupling, showing a slightly-modified device for attaching the coupling to the machines. Fig. 5 is a detail view of one of the coupling-plates shown in Fig. 4. Fig. 6 is a top plan view of two bicycles united by this modified form of coupling; and Fig. 7 is a view similar to Fig. 2, showing this modified construction.

The object of our invention is to provide a light strong coupling which can be quickly and readily applied to and removed from the bicycles, which will hold them rigidly together when in use, and which can be very cheaply made.

In carrying out our invention we employ two rigid frames, the front frame being provided with devices for engaging the steering-head of each machine and the rear frame being provided with devices for engaging the inner bars of the rear forks.

In the drawings, A A represent the coupling-plates for engaging the heads of the machines. One of these plates is shown in detail in Fig. 3$^a$, and it consists of a vertically-disposed plate provided adjacent to its ends with semicylindrical portions $a$, lined with felt or rubber or similar material $a^\times$, to engage the bicycle-head without scratching the enamel. At each end the plate is provided with a lug $a'$ on one side, and the lugs $a'$ $a'$ of the two plates are connected by a series of brace-rods $a^2$ $a^2$, preferably four in number, which engage the lugs $a'$ at one end and are all joined centrally to a four-armed casting or coupling-piece B, each of said arms being bored and threaded and the ends of the rods $a^2$ $a^2$ being threaded to engage the threaded aperture of the coupling-piece B. The rods $a^2$ $a^2$ are also provided with jam-nuts $a^3$ $a^3$, adjacent to the coupling-piece B. It will be observed that the rods $a^2$ $a^2$ can be turned into the coupling-piece B to adjust the coupling-plates with respect to each other, so that they will maintain the heads of the two bicycles in proper position when secured in engagement therewith, and the coupling-plates, with the rods $a^2$ $a^2$ and central coupling-piece, form what we term the "front" frame of the coupling.

The rear frame of the coupling comprises the coupling-plates C C, one of which is shown in detail in Fig. 3$^b$, for engaging the rear fork of each machine, the connecting-rods $c^2$ $c^2$, and the central coupling-piece B', constructed to engage the inner ends of the rods $c^2$ $c^2$, substantially like the coupling-piece B. The rear coupling-plates C are disposed vertically and provided at each end with semicylindrical portions $c$, lined with soft material $a^\times$, to engage the fork-bars and with lugs $c'$, which are engaged by the outer ends of the bars $c^2 c^2$. In order to prevent the coupling-plates C C from slipping upwardly, each of said plates is provided with a metallic hook $c^3$, secured to or formed integrally with said plate, for engaging the horizontal bar of the bicycle-frame and holding the plate from slipping upwardly.

In order to secure the front and rear frames to the bicycle-frames, we provide each frame with two or more tie-rods. The front frame is provided with the tie-rods $a^4 a^4$, which engage at their forward ends lugs $a^5 a^5$ on the coupling-plates A A and at their rear ends are secured to a tie-plate $a^6$. The rear coupling-plates are provided with lugs $c^5$, to which the tie-rods $c^4 c^4$ are secured, and said rods extend forwardly to a tie-plate $c^6$, similar to the plate $a^6$.

E represents an adjusting-screw which is provided with right and left threads to engage threaded apertures in the tie-plates, and said screw is preferably provided with a hand-wheel or milled wheel $e$, as shown, to enable it to be turned. By rotating this screw in the proper direction the tie-rods can be tightened so as to clamp the coupling-plates A A and C C rigidly to the bicycle-frames, and it will also be seen that as this screw controls both frames the whole coupling device can be applied or removed in a very short space of time.

In order to secure the simultaneous operation of the two steering-bars, we provide each of the front forks with a detachable steering-arm F, which can be clamped thereto, as shown in Fig. 1$^a$, and to the outer end of each of said arms is pivoted a socket $f$, the socket of one arm having a right-hand screw-threaded recess extending longitudinally into it and that of the other arm having a left-hand screw-threaded aperture. A connecting-bar $f'$, having its ends provided with right and left screw-threads, is placed in engagement with these sockets and turned until it is adjusted properly, when the two steering-heads will operate simultaneously.

In Figs. 4 to 7, inclusive, we have shown a slight modification of the device, in which the coupling-plates G G are semicylindrical throughout their length and are secured to the heads of the machines by means of straps $g g$, each of which is secured at one end to the coupling-plate and after passing around the head has its other end secured to one of the tie-rods $h$. The two tie-rods are connected at their rear ends by a ring H. The rear frame is connected to the rear forks in the same manner, and the tie-rods $h'$ of the rear frame are joined to a ring H' similar to the ring H. The two rings are then united by a strap I or other flexible connection, and by tightening this single connection each of the coupling parts will be securely drawn to its respective portion of the bicycle-frames.

It is to be understood that in order to couple the steering-heads of the two machines for joint movement the front forks will be provided with arms F, threaded sockets $f$, and rod $f'$, having oppositely-threaded ends engaging said sockets, as shown and described with reference to Figs. 1, 1$^a$, and 3. These parts are, however, omitted in Fig. 4 for greater clearness.

What we claim, and desire to secure by Letters Patent, is—

1. The coupling for bicycles comprising among its members, a front frame provided with coupling-plates having semicylindrical portions for engaging the front portion only of the bicycle-heads, a rear frame having at each end a coupling-plate provided with portions for engaging the rear portions only of the rear forks and a single adjustable clamping device for drawing said frames together to clamp them upon the bicycle-frames, said clamping device forming the sole connection between said front and rear frames and the bicycle-frames, substantially as described.

2. The coupling for bicycles comprising the front frame having at each end a coupling-plate provided with semicylindrical parts for engaging the front faces only of the bicycle-heads, a rear frame having at each end a coupling-plate provided with semicylindrical parts for engaging the rear faces only of the rear forks, a tie-rod connected to each of said coupling-plates and a single clamping device operatively connected with all of said tie-rods, for clamping the bicycle-frames between the front and rear frames of the coupling, substantially as described.

3. A coupling for bicycles comprising among its members, a front frame having at each end a coupling-plate provided with semicylindrical portions to engage the front faces only of the bicycle-heads, the rear frame having at each end a coupling-plate provided with semicylindrical portions to engage the rear faces only of the rear forks, a tie-rod connected to each of said coupling-plates, a tie-plate uniting the ends of the tie-rods of the front frame, a tie-plate uniting the tie-rods of the rear frame and a screw-bolt provided with right and left threaded portions engaging said tie-plates, substantially as described.

4. A coupling for bicycles comprising among its members, a pair of transversely-disposed frames each having a pair of elongated coupling-plates provided with semicylindrical portions for engaging a part of the bicycle-frame on one side only and adjustable connections between said plates engaging said plates at two points, in different horizontal planes, and an adjustable clamping device for drawing said frames toward each other to clamp the bicycle-frames between the front and rear frames of the coupling, substantially as described.

5. A coupling for bicycles comprising the front and rear frames, each consisting of a pair of coupling-plates having semicylindrical portions for engaging a part of a bicycle-frame on one side only, said plates having lugs at their upper and lower ends, a central coupling-piece and a series of connecting-bars adjustably connected with said coupling-piece and having their outer ends connected to the lugs on said coupling-plates, retaining-hooks on the coupling-plates of the rear frame, a single central clamping device, and tie-rods extending therefrom to the coupling-plates of the front and rear frames, substantially as described.

In testimony whereof we affix our signatures in presence of two witnesses.

THOMAS COLDWELL.
HARRY T. H. COLDWELL.

Witnesses:
J. B. SCOTT,
F. A. GRENZEBACH.